April 27, 1943.  A. G. ANDERSON  2,317,509
UNDERINFLATED TIRE SIGNALING DEVICE
Filed Feb. 6, 1942
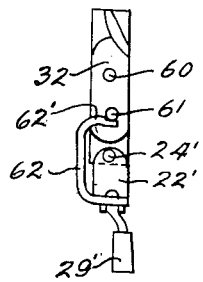
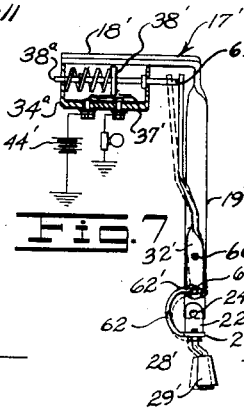
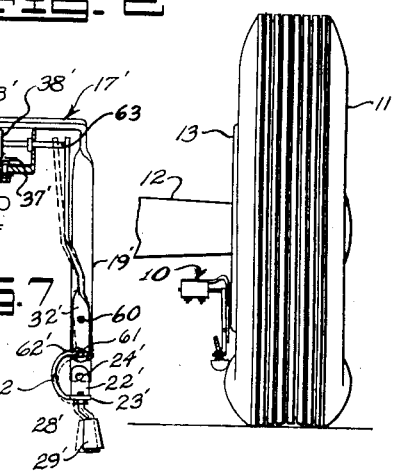
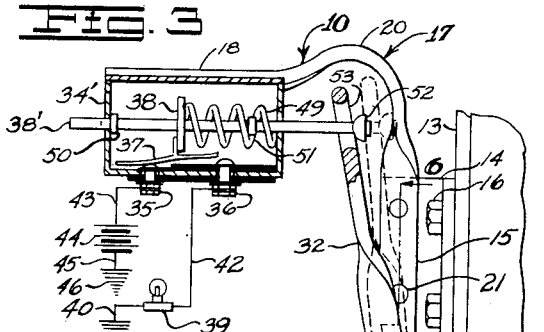
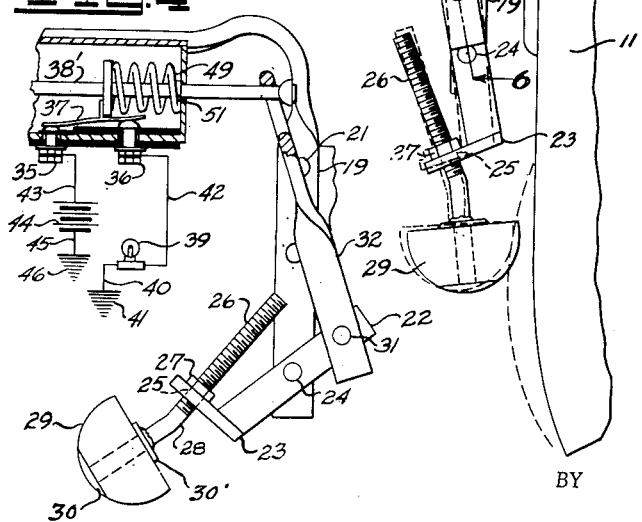
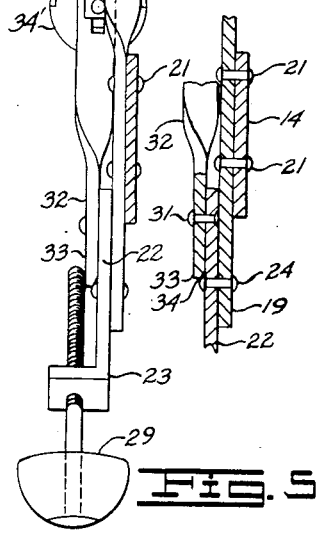
INVENTOR.
A. G. ANDERSON
BY B. J. Craig,
ATTORNEY Patented Apr. 27, 1943

2,317,509

UNITED STATES PATENT OFFICE 2,317,509

UNDERINFLATED TIRE SIGNALING DEVICE

Anders G. Anderson, Los Angeles, Calif.

Application February 6, 1942, Serial No. 429,752

8 Claims. (Cl. 200—58)

This invention relates to underinflated tire signaling devices. The general object of the invention is to provide a simple and effective signal means for indicating when the tire of a motor vehicle has assumed a partly deflated position.

Another object of the invention is to provide a tire signaling device wherein a circuit to a signal is operated by a member which is actuated by a tire when the latter becomes partly deflated.

A further object of the invention is to provide a novel operating arm for a tire signaling device.

An additional object of the invention is to provide the arm of a tire signaling device with a novel safety means whereby sudden or excessive pressure upon the arm will not have any damaging effect.

Another object of my invention is to provide a signaling device which will indicate when a vehicle is overloaded.

Other purposes and advantages of the invention will be apparent from the following description taken in connection with the accompanying drawing, wherein Fig. 1 is a face view of an automobile tire and associated parts showing my invention applied thereto;

Fig. 2 is a view similar to Fig. 1 showing the tire partly deflated;

Fig. 3 is a side elevation, partly in section, showing my improved operating member, the signal and a wiring diagram;

Fig. 4 is a fragmentary view similar to Fig. 3 and showing the parts in another position;

Fig. 5 is an end view of the operating member;

Fig. 6 is a sectional view taken on line 6—6, Fig. 3;

Fig. 7 is a view similar to Fig. 3 showing a modification; and

Fig. 8 is an enlarged view showing the modified connection.

Referring to the drawing by reference characters, I show my invention as embodied in an underinflated tire signaling device which is indicated generally at 10. As shown the tire signaling device is associated with a tire 11 which may be a passenger or truck or similar vehicle tire. The tire 11 is shown as supported on an axle 12 and the construction includes a brake drum housing 13.

The signaling device embodying the features of my invention is shown as mounted on an L-shaped bracket 14 with one side of the bracket as at 15 secured to the brake drum housing 13 by bolts 16. On the other portion of the bracket, I mount an L-shaped arm indicated generally at 17. This arm includes a horizontal portion 18 and the vertical portion 19, with a curved bend 20 at the junction of the portions 18 and 19. The vertical portion 19 of the arm is secured to the bracket 14 as by rivets 21.

Mounted upon the lower end of portion 19 I provide a link 22 the lower end of which is bent laterally and outwardly as at 23 to provide an offset arm. The link 22 is pivoted to the portion 19 by means such as a rivet 24 and the upper portion of the rivet protrudes above the link 22 as shown in Fig. 6.

The offset portion 23 is provided with a threaded aperture 25 through which a threaded rod 26 extends. A lock nut 27 serves to hold the rod 26 in adjusted position. The lower end of the rod 26 is bent as at 28 and extends downwardly and receives a roller 29 on the lower end thereof. Collars 30 and 30' on the rod 28 serve to hold the roller 29 in place. The roller 29 is normally disposed in the position shown in Fig. 1 and is free from engagement with the tire 11 when the latter is properly inflated.

Mounted upon the upper end portion of the link 22 by means such as a rivet 31, I arrange a second link 32. The lower end of the second link at 33 includes a notch 34 (see Fig. 6) which engages a protuberant portion of a pin 24 thus normally holding the links 22 and 32 in alignment.

Mounted upon the horizontal portion 18 of the arm I provide a switch housing 34'. This housing includes contact members 35 and 36 which are insulated from the housing. A resilient circuit closing arm 37 is connected to a collar 38 mounted on a rod 38' which slides in the housing and at all times engages the contact 35. The circuit closing arm 37 is adapted to move with the rod 38' and to engage the contact 36 and close the circuit to a signal member showing as a lamp 39.

This lamp 39 has one side connected by a lead 40 to a ground 41. A lead 43 is connected with the contact 35 and with a battery 44. From the battery a lead 45 extends to a ground 46. The construction is such that when the circuit member 37 closes current will be supplied to the signal lamp 39.

The collar 38 on the rod 38' is engaged by one end of a spring 49. The other end of the spring abuts against the inner end of the housing 34 thus normally urging the rod 38' to the left in Fig. 3. Movement of the rod is limited by stop members 50 and 51 on the rod which engages the housing. The rod 38' is provided with a head 52 and adjacent the head the rod passes through a slot 53 in the link 32 and the construction is such that as the link is moved by the roller 29, when the latter is shifted by engagement with a partially deflated tire, the rod is pulled to the right in Fig. 3 thus closing the circuit and operating the signal. This deflation of the tire is signaled to the driver by the signal 39 which is preferably arranged in the instrument panel of the vehicle.

Should the tire suddenly blow out, the roller 29 would be abruptly shifted outwardly and would thus break the connection between the protuberant portion of the pin 24 and the notch 34 thus allowing the links to break their alignment as shown in Fig. 4. In this way damage to the operating portions of the mechanisms is avoided.

In Fig. 7, I show a modification of my invention. In Fig. 7 parts similar to those previously described are indicated by similarly primed reference characters.

In the modification the device includes an L-shaped arm indicated generally at 17' and including a horizontal portion 18' and a vertical portion 19'. The vertical portion pivotally supports a link 22' which is pivoted as at 24' and includes an offset lower portion 23' which supports a rod 28' similar to the rod 28 and adjustable on the part 23'. The rod 28' supports a roller 29'. Mounted upon the portion 19' I show a second link 32' which is pivotally supported as at 60. The link 32' at its lower end includes an outwardly directed pin 61 which is engaged by the end portion of a looped resilient tongue 62 mounted on the offset portion 23'. When the lower link 22' is turned about its pivot 24' a shoulder 62' on the tongue 62 engages the pin 61 on the link 32' and rocks the latter about its pivot 60. Under excessive or suddenly applied force the shoulder 62' slides over the pin 61 and prevents breakage of the parts.

The switch housing 34a includes a circuit similar to that previously described with the circuit closing arm 37' movable to the left in Fig. 7 to close the circuit. This arm 37' is mounted on a collar 38' which is in turn mounted on a rod 38a the end 63 of which is engaged by the upper end of the link 32' to thus close the circuit.

The operation of the modification will be apparent from the description given above.

From the foregoing description it will be apparent that I have invented a novel tire pressure and vehicle overloading signaling device which can be economically manufactured and which is highly efficient for its intended purpose.

Having thus described my invention, I claim:

1. In an underinflated tire signaling device, a support, a link pivotally mounted on said support, a tire engaging roller mounted on said link, a second link pivotally mounted on said first link, releasable means to normally hold said links aligned, a switch device, and means operated by movement of said links for actuating said switch device.

2. In an underinflated tire signaling device, a bracket, an arm mounted on said bracket, said arm including a vertical portion and a horizontal portion, a link, a pin pivotally supporting the link adjacent the lower end of said vertical portion, said link including an offset arm disposed below said horizontal arm portion, a depending rod mounted on said offset arm, a roller mounted on the lower end of said rod, a switch, means to operate the switch, said means including a sliding arm, and means operable by said link for shifting said sliding arm.

3. In an underinflated tire signaling device, an arm, said arm including a vertical portion and a horizontal portion, a link, a pin pivotally supporting the link adjacent the lower end of said vertical portion, a rod on said link, a roller on said rod, a second link pivotally mounted on the first link, releasable means to normally hold said links in alignment, a switch housing on said horizontal portion, a switch in said housing, a sliding arm for operating said switch, said arm projecting from said switch housing, and means connecting said second link and said switch arm.

4. In an underinflated tire signaling device, a bracket, an arm mounted on said bracket, said arm including a vertical portion and a horizontal portion, a link, a pin pivotally supporting the link adjacent the lower end of said vertical portion, said link including an offset arm disposed below said horizontal arm portion, a rod on said offset arm, a roller on said rod, a second link pivotally mounted intermediate its length on the first link, releasable means to normally hold said links in alignment, a switch device, means to operate the switch device, said means including a sliding arm, said second link having an elongated slot receiving said sliding arm, said sliding arm having a head on the end, and means to normally urge the sliding arm to one position.

5. In an underinflated tire signaling device, an arm, said arm including a vertical portion and a horizontal portion, a link, a pin pivotally supporting the link adjacent the lower end of said vertical portion, a depending rod mounted on said link, a roller mounted on the lower end of said rod, a second link pivotally mounted intermediate its length on the first link, releasable means to normally hold said links in alignment, a switch housing on said horizontal portion, a switch in said housing, a sliding arm for operating said switch, said arm projecting from said switch housing, means operatively connecting said second link and said switch arm, and means to normally urge the switch to "off" position.

6. In an underinflated tire signaling device, a bracket adapted to be mounted upon a vehicle, an arm mounted on said bracket, said arm including a vertical portion and a horizontal portion, a link, a pin pivotally supporting the link adjacent the lower end of said vertical portion, said link including an offset arm disposed below said horizontal arm portion, a depending rod mounted on said arm, a roller mounted on the lower end of said rod, a second link pivotally mounted intermediate its length on the first link, releasable means to normally hold said links in alignment, a switch housing on said horizontal portion, a switch in said housing, a sliding arm for operating said switch, said arm projecting from said switch housing, said second link having an elongated slot receiving said switch arm, said switch arm having a head on the end of the projecting portion, and means to normally urge the switch to "off" position.

7. In an underinflated tire signaling device, a bracket adapted to be mounted upon a vehicle, an L-shaped arm mounted on said bracket, said arm including a vertical portion and a horizontal portion, a link, a pin pivotally supporting the link adjacent the lower end of said vertical portion, said link including an offset arm disposed below said horizontal arm portion, a rod adjustably mounted on said arm, said rod having an arcuate lower end, a roller rotatably mounted on the lower end of said rod, a second link pivotally mounted intermediate its length on the first link on a pivot disposed above said pin, the lower end of said second link being slidable across the first link, releasable means to normally hold said links in alignment, a switch housing on said horizontal portion, a switch in said housing, a sliding arm for operating said switch, said sliding arm projecting from said switch housing, said second link having an elongated slot receiving said switch arm, said switch arm having a head on the end of the projecting portion, and means to normally urge the switch to "off" position.

8. In an underinflated tire signaling device, a bracket adapted to be mounted upon a vehicle, an L-shaped arm mounted on said bracket, said arm including a vertical portion and a horizontal portion, a link, a pin pivotally supporting the link adjacent the lower end of said vertical portion, said link including an offset arm disposed below said horizontal arm portion, said arm having a threaded aperture, a threaded rod passing through said aperture, said rod having an arcuate lower end, a roller rotatably mounted on the lower end of said rod, a second link pivotally mounted intermediate its length on the first link on a pivot disposed above said pin, the lower end of said second link being slidable across the first link, said pin including a protruding portion in the path of the second link, said second link having a notch receiving said protuberant portion to thereby hold said links in alignment, a switch housing on said horizontal portion, a switch in said housing, a sliding arm for operating said switch, said sliding arm projecting from said switch housing, said second link having an elongated slot receiving said switch arm, said switch arm having a head on the end of the projecting portion, and means to normally urge the switch to "off" position.

ANDERS G. ANDERSON.